United States Patent
Moteki et al.

(10) Patent No.: US 10,766,820 B2
(45) Date of Patent: *Sep. 8, 2020

(54) CERAMIC SINTERED BODY

(71) Applicant: NGK SPARK PLUG CO., LTD., Nagoya-shi, Aichi (JP)

(72) Inventors: Jun Moteki, Seto (JP); Yusuke Katsu, Komaki (JP); Takeshi Mitsuoka, Konan (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 18 days.

This patent is subject to a terminal disclaimer.

(21) Appl. No.: 16/312,362

(22) PCT Filed: Jun. 19, 2017

(86) PCT No.: PCT/JP2017/022493
§ 371 (c)(1),
(2) Date: Dec. 21, 2018

(87) PCT Pub. No.: WO2018/003564
PCT Pub. Date: Jan. 4, 2018

(65) Prior Publication Data
US 2019/0233333 A1    Aug. 1, 2019

(30) Foreign Application Priority Data
Jun. 27, 2016 (JP) .................. 2016-126330

(51) Int. Cl.
*C04B 35/117* (2006.01)
*C04B 35/44* (2006.01)
(Continued)

(52) U.S. Cl.
CPC ............ *C04B 35/117* (2013.01); *C04B 35/10* (2013.01); *C04B 35/44* (2013.01);
(Continued)

(58) Field of Classification Search
CPC .............................. C04B 35/111; C04B 35/117
See application file for complete search history.

(56) References Cited

U.S. PATENT DOCUMENTS 7,879,258 B2 * 2/2011 De Graaf ............ C04B 35/6261
                                                    252/301.4 R
8,496,852 B2 * 7/2013 De Graaf ............ C04B 35/6261
                                                    252/301.4 R
(Continued)

FOREIGN PATENT DOCUMENTS

EP    2 554 627 A1    2/2013
JP    2002-255634 A   9/2002
(Continued)

OTHER PUBLICATIONS

Japan Patent Office, International Search Report issued in corresponding Application No. PCT/JP2017/022493 dated Sep. 5, 2017.
(Continued)

*Primary Examiner* — Karl E Group
(74) *Attorney, Agent, or Firm* — Stites & Harbison, PLLC; Jeffrey A. Haeberlin; Terry L. Wright

(57) ABSTRACT

The durability of a ceramic sintered body is improved, and a reduction in its light emission intensity and the occurrence of a chromaticity variation are suppressed. The ceramic sintered body contains alumina and a compound represented by $M1_{3-X}M2_XM3_5O_{12}$. The volume percent of the compound in the ceramic sintered body is from 3% to 70% inclusive. The ratio of the intensity of XRD from a complex oxide of aluminum and M2 to the intensity of XRD from the compound in the ceramic sintered body is less than 0.05. The average grain diameter of the alumina contained in the ceramic sintered body is from 0.30 (μm) to 3.00 (μm) inclusive. M1 is at least one selected from Sc, Y, and lanthanoid elements, and M2 is at least one selected from lanthanoid elements except any lanthanoid element selected for M1. M3 is at least one of Al and Ga, and X is from 0.003 to 0.500 inclusive.

6 Claims, 1 Drawing Sheet

(51) Int. Cl.
  *C04B 35/626* (2006.01)
  *C04B 35/64* (2006.01)
  *C09K 11/77* (2006.01)
  *C04B 35/10* (2006.01)

(52) U.S. Cl.
  CPC .... *C04B 35/6261* (2013.01); *C04B 35/62625* (2013.01); *C04B 35/62695* (2013.01); *C04B 35/64* (2013.01); *C09K 11/7774* (2013.01); C04B 35/62605 (2013.01); C04B 2235/3217 (2013.01); C04B 2235/3222 (2013.01); C04B 2235/3224 (2013.01); C04B 2235/3225 (2013.01); C04B 2235/3227 (2013.01); C04B 2235/3229 (2013.01); C04B 2235/3286 (2013.01); C04B 2235/5436 (2013.01); C04B 2235/5445 (2013.01); C04B 2235/602 (2013.01); C04B 2235/604 (2013.01); C04B 2235/6581 (2013.01); C04B 2235/762 (2013.01); C04B 2235/764 (2013.01); C04B 2235/77 (2013.01); C04B 2235/785 (2013.01); C04B 2235/786 (2013.01); C04B 2235/96 (2013.01); C04B 2235/9607 (2013.01); C04B 2235/9646 (2013.01)

(56) References Cited

U.S. PATENT DOCUMENTS

| 9,605,201 | B2* | 3/2017 | Yamaguchi | F21V 9/32 |
|---|---|---|---|---|
| 2004/0188655 | A1 | 9/2004 | Wu | |
| 2008/0187746 | A1* | 8/2008 | De Graaf | C04B 35/6261 428/332 |
| 2011/0181173 | A1* | 7/2011 | De Graaf | C04B 35/6261 313/483 |
| 2012/0045634 | A1 | 2/2012 | Irie | |
| 2013/0256599 | A1* | 10/2013 | Irie | C09K 11/7774 252/301.4 R |
| 2013/0328095 | A1* | 12/2013 | Iba | C04B 35/117 257/98 |
| 2015/0219291 | A1* | 8/2015 | Yamaguchi | C09K 11/7774 362/259 |
| 2019/0198726 | A1* | 6/2019 | Moteki | C04B 35/44 |
| 2019/0309223 | A1* | 10/2019 | Sunagawa | C04B 35/44 |

FOREIGN PATENT DOCUMENTS

| JP | 5088977 B2 | 12/2012 |
|---|---|---|
| JP | 5490407 B2 | 5/2014 |
| JP | 2014-132084 A | 7/2014 |
| JP | 5650885 B2 | 1/2015 |
| JP | 2015-149394 A | 8/2015 |
| JP | 2016-018878 A | 2/2016 |

OTHER PUBLICATIONS

European Patent Office, Extended European Search Report issued in corresponding Application No. EP 17819923.8 dated Oct. 15, 2019.
European Patent Office, Office Action issued in corresponding Application No. 17 819 923.8 dated May 29, 2020.
Saint Gobain: "YAG(Ce)", Aug. 31, 2016 (Aug. 31, 2016), XP055698136, Retrieved from the Internet: URL:https://www.crystals.saint-gobain.com/sites/imdf.crystals.com/files/documents/yag-material-data-sheet_69775.pdf [retrieved on May 26, 2020].

* cited by examiner

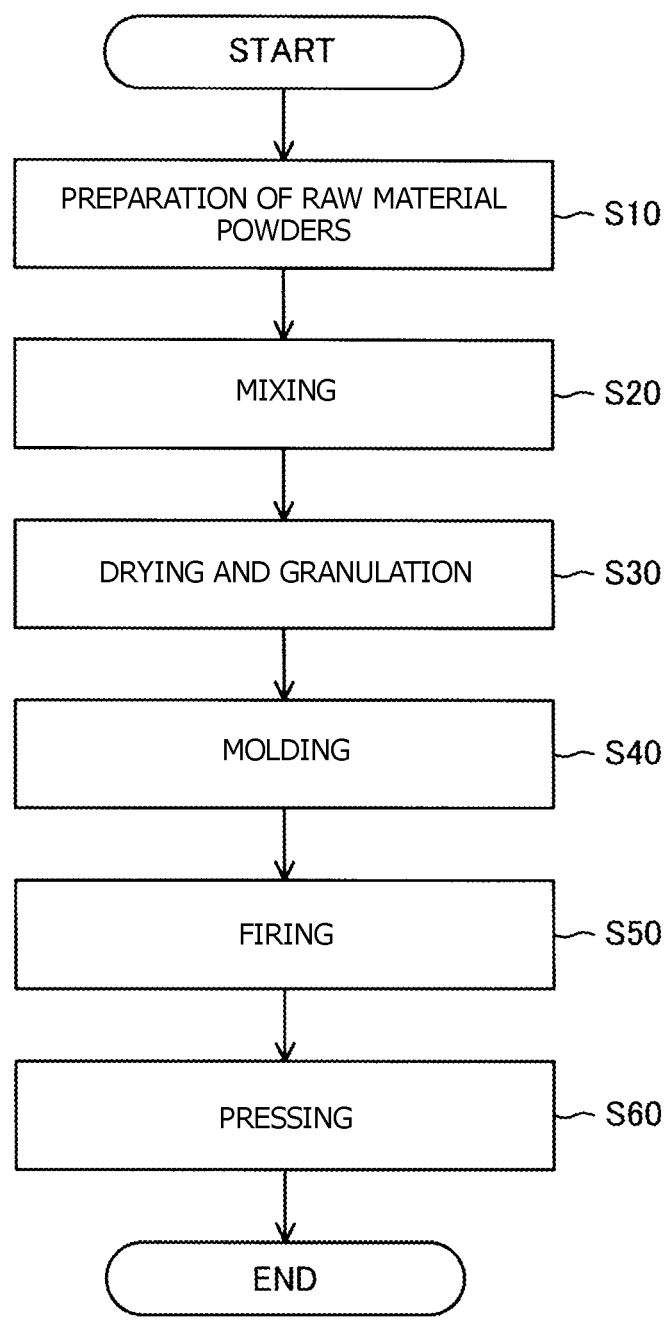

CERAMIC SINTERED BODY

TECHNICAL FIELD

The present invention relates to a ceramic sintered body.

BACKGROUND ART

In one known structure of lighting devices using light emitting diodes (LED), laser diodes (LD), etc. as light sources, white light is obtained by passing light from, for example, a blue LED or a blue LD through a fluorescent material that emits light of a color complementary to blue. The fluorescent material used may be a resin, glass, etc. In recent years, the brightness of light sources is increasing, and the temperature of their fluorescent material tends to increase. Therefore, a ceramic sintered body with high heat resistance is receiving attention as a fluorescent material. For example, a fluorescent material composed of a ceramic sintered body prepared by adding cerium (Ce) to yttrium aluminum garnet (YAG) shows yellow fluorescence and is used in combination with a blue LED or a blue LD to obtain white light. Patent Document 1 describes a ceramic sintered body in which a fluorescent phase represented by YAG:Ce is contained in an alumina ($Al_2O_3$) matrix phase.

PRIOR ART DOCUMENT

Patent Document

Patent Document 1: Japanese Patent Application Laid-Open (kokai) No. 2014-132084

SUMMARY OF THE INVENTION

Problems to be Solved by the Invention

In the technique described in Patent Document 1, a $CeAl_{11}O_{18}$ phase, which is a third component different from the matrix phase and the fluorescent phase, is present in the ceramic sintered body in order to prevent the occurrence of a chromaticity variation caused by volatilization of Ce during firing when the ceramic sintered body is produced. However, since the $CeAl_{11}O_{18}$ phase present absorbs light, the light emission intensity of the fluorescent material may decrease. When the thickness of the fluorescent material is reduced in order to suppress the reduction in the light emission intensity, the durability of the fluorescent material may deteriorate. These problems occur not only in the ceramic sintered body in which the $CeAl_{11}O_{18}$ phase is present but also in a ceramic sintered body in which a different third component (such as $CeAlO_3$ or $NdAl_{11}O_{18}$) is present. There is therefore a need for a technique that can suppress a reduction in light emission intensity and the occurrence of a chromaticity variation, while enhancing the durability, in a ceramic sintered body used for a fluorescent material that emits light of a color complementary to the color of light from a blue LED or LD.

Means for Solving the Problems

The present invention has been made to solve the above problems and can be embodied in the following modes.
(1) According to one mode of the present invention, a ceramic sintered body is provided. This ceramic sintered body is characterized by comprising alumina ($Al_2O_3$); and a compound represented by $M1_{3-x}M2_xM3_5O_{12}$, wherein the volume percent of the compound in the ceramic sintered body is from 3% to 70% inclusive; the ratio of the intensity of X-ray diffraction from a complex oxide of aluminum (Al) and the M2 to the intensity of X-ray diffraction from the compound in the ceramic sintered body is less than 0.05; the average grain diameter of the alumina ($Al_2O_3$) contained in the ceramic sintered body is from 0.30 (µm) to 3.00 (µm) inclusive; the M1 is at least one selected from scandium (Sc), yttrium (Y), and lanthanoid elements; the M2 is at least one selected from lanthanoid elements except any lanthanoid element selected for the M1; the M3 is at least one of aluminum (Al) and gallium (Ga); and the X is from 0.003 to 0.500 inclusive. In the ceramic sintered body of the above mode, the reduction in light emission intensity and the occurrence of a chromaticity variation can be suppressed while the durability of the ceramic sintered body is improved.
(2) In the above-described mode, the ceramic sintered body may be characterized in that the M1 is at least one selected from scandium (Sc), yttrium (Y), gadolinium (Gd), terbium (Tb), erbium (Er), ytterbium (Yb), and lutetium (Lu); and the M2 is at least one selected from cerium (Ce), europium (Eu), terbium (Tb), and ytterbium (Yb) except the at least one element selected for the M1. In the ceramic sintered body of the above mode, the reduction in light emission intensity and the occurrence of a chromaticity variation can be further suppressed while the durability of the ceramic sintered body is improved.
(3) In the above-described mode, the ceramic sintered body may be characterized in that the M1 is yttrium (Y). In the ceramic sintered body of the above mode, the reduction in light emission intensity and the occurrence of a chromaticity variation can be further suppressed while the durability of the ceramic sintered body is improved.
(4) In the above-described mode, the ceramic sintered body may be characterized in that the M2 is cerium (Ce). In the ceramic sintered body of the above mode, the reduction in light emission intensity and the occurrence of a chromaticity variation can be further suppressed while the durability of the ceramic sintered body is improved.
(5) In the above-described mode, the ceramic sintered body may be characterized in that the M3 is aluminum (Al). In the ceramic sintered body of the above mode, the reduction in light emission intensity and the occurrence of a chromaticity variation can be further suppressed while the durability of the ceramic sintered body is improved.
(6) In the above-described mode, the ceramic sintered body may be characterized in that the M1 is yttrium (Y), the M2 is cerium (Ce), and the M3 is aluminum (Al). According to such a mode, there can be provided a ceramic sintered body in which the reduction in light emission intensity and the occurrence of a chromaticity variation can be further suppressed while the durability of the ceramic sintered body is improved.

The present invention can be embodied in various forms other than the above-described modes of the ceramic sintered body. For example, the present invention can be embodied in the form of a method for producing the ceramic sintered body, in the form of a fluorescent material such as a light emitting body including the ceramic sintered body, and in the form of a light wavelength converter including the fluorescent material.

BRIEF DESCRIPTION OF THE DRAWINGS

Flowchart showing a method for producing a ceramic sintered body.

MODES FOR CARRYING OUT THE INVENTION

A. Structure of Ceramic Sintered Body

A1. Composition of Ceramic Sintered Body

A ceramic sintered body of the present embodiment contains alumina ($Al_2O_3$) and a compound having a composition represented by the following formula (1).

$$M1_{3-X}M2_XM3_5O_{12} \qquad (1)$$

Here, M1 is at least one element selected from scandium (Sc), yttrium (Y), and lanthanoid elements, and M2 is at least one element selected from lanthanoid elements except any lanthanoid element selected for M1. Element M3 is at least one of aluminum (Al) and gallium (Ga). In other words, M1 is at least one selected from rare-earth elements.

The compound contained in the ceramic sintered body and represented by formula (1) above has the property that the transmittance for blue light is high. This is because of the following reason. The compound represented by formula (1) above has a so-called garnet structure, and the garnet structure is a cubic crystal and therefore does not have optical anisotropy. When excited by blue light, the compound represented by formula (1) above exhibits green to yellow to orange fluorescence. By replacing part of M1 sites in the garnet structure (the compound represented by formula (1) above) with M2 serving as a luminescent center, various types of fluorescence can be obtained. This is because M2 is at least one selected from lanthanoid elements except any lanthanoid element selected for M1. M1 is at least one selected from scandium (Sc), yttrium (Y), and lanthanoid elements, and M2 is at least one selected from lanthanoid elements except any lanthanoid element selected for M1, so that the M1 sites are easily replaced with M2. Therefore, the compound represented by formula (1) above has high light emission efficiency.

Alumina ($Al_2O_3$) contained in the ceramic sintered body absorbs only a small amount of visible light and therefore contributes to an improvement in the light emission intensity of the ceramic sintered body. Since the thermal conductivity of alumina ($Al_2O_3$) is high, it contributes to the thermal resistance of the ceramic sintered body. Since the strength of alumina is high, it contributes to the durability of the ceramic sintered body. Therefore, the ceramic sintered body containing alumina ($Al_2O_3$) and the compound represented by formula (1) above is excellent in thermal resistance and durability.

The coefficient X in formula (1) above is from 0.003 to 0.500 inclusive. When the coefficient X is 0.003 or more, the ratio of M2 is high, and the fluorescence from the ceramic sintered body is sufficient. When the coefficient X is 0.500 or less, the ceramic sintered body is unlikely to contain a third component other than alumina and the compound represented by formula (1) above, so that a reduction in light emission intensity of the ceramic sintered body due to the third component can be prevented. The third component is, for example, a complex oxide such as $CeAl_{11}O_{18}$. For the sake of simplicity, in the following description, the condition that the ceramic sintered body contains alumina ($Al_2O_3$) and the compound having the composition represented by formula (1) above, the condition that M1, M2, and M3 are selected from the above-described elements, and the condition that the coefficient X is from 0.003 to 0.500 inclusive are collectively referred to as "condition (1)."

In order to further suppress the reduction in the light emission intensity of the ceramic sintered body and the reduction in chromaticity variation, M1 in the compound represented by formula (1) above is preferably at least one selected from scandium (Sc), yttrium (Y), gadolinium (Gd), terbium (Tb), erbium (Er), ytterbium (Yb), and lutetium (Lu). M2 is more preferably at least one selected from cerium (Ce), europium (Eu), terbium (Tb), and ytterbium (Yb) and is other than the at least one element selected for M1. The chromaticity variation is the X-direction variation in chromaticity (ΔCIEx) of light passing through the ceramic sintered body when it is irradiated with blue light.

In order to further suppress the reduction in the light emission intensity of the ceramic sintered body and the reduction in chromaticity variation, M1 is more preferably yttrium (Y). M2 is more preferably cerium (Ce). M3 is more preferably aluminum (Al).

In the composition of the compound represented by formula (1) above, M1 is more preferably yttrium, M2 is more preferably cerium (Ce), and M3 is more preferably aluminum (Al). This is because a yellow-light-emitting ceramic sintered body can be provided which has improved durability and in which the reduction in light emission intensity and the occurrence of a chromaticity variation can be further suppressed. This ceramic sintered body is suitable as a fluorescent material that is combined with a blue LED or a blue LD in order to obtain white light.

A2. Volume Percent of Compound:

The volume percent (vol %) of the compound represented by formula (1) in the ceramic sintered body is from 3% to 70% inclusive (condition (2)). When the volume percent is 3% or more, the light emitted from the ceramic sintered body is sufficient. When the volume percent is 70% or less, a reduction in the thermal conductivity of the ceramic sintered body can be prevented. In this case, when the ceramic sintered body is used as a fluorescent material of a color complementary to a blue LED or a blue LD, the fluorescent material is prevented from being heated to high temperature, and the occurrence of temperature quenching can be prevented.

A3. Ratio of Intensity of X-Ray Diffraction from Complex Oxide to that from Compound:

In the ceramic sintered body, the ratio of the intensity of XRD (X-ray diffraction) from a complex oxide of aluminum (Al) and M2 to that from the compound represented by formula (1) above is less than 0.05 (condition (3)). When the XRD intensity ratio is less than 0.05, the amount of the complex oxide is sufficiently smaller than the amount of the compound represented by formula (1) above, and therefore a reduction in emission intensity and the occurrence of a chromaticity variation can be suppressed. The ceramic sintered body in which the XRD intensity ratio is less than 0.05 can be regarded as containing substantially no complex oxide. The details of the XRD intensity ratio will be described later.

A4. Average Grain Diameter of Alumina:

The average grain diameter of alumina ($Al_2O_3$) contained in the ceramic sintered body is from 0.3 (μm) to 3.00 (μm) inclusive (condition (4)). When the average grain diameter of alumina ($Al_2O_3$) is within the above range, a reduction in the light emission intensity of the ceramic sintered body and a reduction in chromaticity variation can be suppressed. If the average grain diameter is less than 0.3 (μm), the amount of light passing through the ceramic sintered body is large, and the LED light or the LD light is insufficiently diffused, so that a chromaticity variation may occur. If the average grain diameter exceeds 3.00 (μm), the light is excessively scattered in the ceramic sintered body, and the amount of light passing through the ceramic sintered body decreases, so that the light emission intensity may decrease. Methods for analyzing the above-described conditions (1) to (4) for the ceramic sintered body will next be described.

B. Analysis of Ceramic Sintered Body:

B1. Composition of Ceramic Sintered Body:

The composition of the ceramic sintered body can be analyzed as follows. First, XRF (X-ray Fluorescence) is used to identify elements contained in the ceramic sintered body. Next, XRD is used to identify compounds contained in the ceramic sintered body. Through the above analysis, it can be confirmed that the ceramic sintered body contains alumina ($Al_2O_3$) and the compound represented by formula (1) above and the coefficient X is from 0.003 to 0.500 inclusive. The composition of the ceramic sintered body may be analyzed using SEM-EDX (Scanning Electron Microscope/Energy Dispersive X-ray Spectroscopy).

B2. Volume Percent of Compound:

The volume percent of the compound represented by formula (1) above in the ceramic sintered body can be analyzed and computed as follows. First, a cross section of the ceramic sintered body is mirror-polished and etched. The etched cross section is observed by SEM-EDX to identify compositions of crystal grains in the cross section. The cross section is observed at a magnification of, for example, 10,000×. Next, the area A occupied by the compound in the observed SEM image and the area B occupied by components other than the compound are computed using image analysis software (WinRoof which is a product of MITANI CORPORATION). Using the computed values, A/(A+B) is computed, and the area ratio in the two-dimensional cross section is converted to a volume percent using the image analysis software. This computation is performed in arbitrary five observation areas in the cross section, and their average is used as the volume percent of the compound in the ceramic sintered body.

B3. Ratio of Intensity of XRD from Complex Oxide to that from Compound:

The ratio R of the intensity of XRD from the complex oxide of aluminum (Al) and M2 to that from the compound represented by formula (1) above can be analyzed and computed as follows. First, the ceramic sintered body is analyzed by XRD. Using the results of the analysis, the ratio of the intensity of XRD from the complex oxide of aluminum (Al) and M2 to that from the compound represented by formula (1) above is computed from formula (2) below.

$$R=P1/P2 \quad (2)$$

Here, P1 is the intensity of the strongest peak (main peak) among the measured XRD peaks of the complex oxide of aluminum (Al) and M2. P2 is the intensity of the strongest peak (main peak) among the measured XRD peaks of the compound represented by formula (1) above. In the XRD measurement, CuKα radiation is used as an X-ray source, and a diffraction pattern of 2θ values is read. A line connecting points at which no peak is present in the diffraction pattern is used as a baseline, and the length of a line segment from the peak top of a peak to the intersection of a perpendicular extending from the peak top and the baseline is used as the intensity of the peak. The "points at which no peak is present" mean points on the baseline in the XRD chart. In the XRD measurement, a certain level of noise etc. are generally contained, and a significant intensity level of X-ray diffraction is observed at a position with no peak (no diffraction point). Therefore, signals not originating from a diffraction point such as noise, background, etc., are subtracted from the measured intensity, and the resulting intensity may be used as the baseline. The baseline may be determined by computation built in the measurement device.

B4. Average Grain Diameter of Alumina ($Al_2O_3$):

The average grain diameter (average crystal grain diameter) of alumina ($Al_2O_3$) can be computed as follows. First, a cross section of the ceramic sintered body is mirror-polished and subjected to thermal etching. The etched cross section is observed using SEM-EDX to identify the composition of each of the crystal grains in the cross section. Next, a line intercept method is used to compute the average grain diameter of alumina. Specifically, a straight line is freely drawn on the SEM image so as to cross crystal grains. Then the grain diameters of alumina crystal grains are measured, and the sum of the grain diameters of the alumina crystal grains is computed. This procedure is performed for arbitrary five observation areas, and the diameters of at least 200 grains in total are measured. The average grain diameter of alumina is computed from the sum of the diameters of the grains in the five observation areas and the number of grains used for the measurement.

C. Method for Producing Ceramic Sintered Body:

The FIGURE is a flowchart showing a method for producing the ceramic sintered body. To produce the ceramic sintered body, raw material powders of the ceramic sintered body are first prepared (step S10). In step S10, alumina powder and powders for forming the compound represented by formula (1) above are prepared. The powders for forming the compound are, for example, an oxide of M1, an oxide of M2, and an oxide of M3. The purity of each powder is preferably 99.9% or higher. Theses powders are weighed such that the volume percent of the compound represented by formula (1) above in the ceramic sintered body is from 3% to 70% inclusive. Moreover, these are weighed such that the coefficient X is from 0.003 to 0.500 inclusive.

Next, the raw material powders are mixed (step S20). Preferably, the raw material powders are mixed in stages of progress. Specifically, first, the powders for forming the compound represented by formula (1) above and, for example, ethanol serving as a solvent are charged into a ball mill and are then pulverized and mixed. In the ball mill, alumina balls, for example, are used. The time of mixing is, for example, 20 hours. Next, the alumina powder and the mixture of the raw material powders of the compounds are pulverized and mixed in the ball mill. The time of mixing is, for example, 20 hours. Preferable, the powders are pulverized and mixed in two stages as described above to obtain a slurry of the raw material powders. In the slurry obtained as described above, its components are dispersed uniformly, so that the generation of a third component in the ceramic sintered body can be prevented.

Next, the slurry is dried and granulated (step S30). The granulated powder can be obtained from the slurry, for example, by the following method. The slurry is dried in a hot-water bath. The solvent is thereby removed from the slurry to obtain a powder. Then the powder obtained is sieved.

Next, the granulated powder is molded (step S40). In step S40, the granulated powder obtained is molded using a press to obtain a compact. The molding pressure is, for example, 98 MPa.

Next, the compact is fired (step S50). In step S50, the compact is fired, for example, in a vacuum atmosphere at a temperature of 1,350 to 1,450° C. For example, the compact may be fired with the compact in contact with a powder having a composition similar to the composition of the compact. In this case, a change in the composition of the compact by firing can be prevented.

Next, the fired compact is pressed (step S60). In step S60, hot isostatic pressing (HIP), for example, is used to press the fired compact in an argon atmosphere at a temperature of 1,300 to 1,550° C. and 100 to 150 MPa to thereby densify the fired compact. The ceramic sintered body is thereby obtained. When the compact has been densified sufficiently in step S50, step S60 may be omitted.

D. Experiments and Results:

The reason that a reduction in light emission intensity and a reduction in chromaticity variation can be suppressed when the ceramic sintered body meets the above conditions (1) to (4) will be described based on the results of experiments 1 to 5.

Table 1 is a table showing the results of experiment 1. In experiment 1, samples 1 to 11 with different coefficients X for M3 were produced. Samples 1 to 11 differ in the coefficient X for M3. The coefficient X in each sample is as shown in Table 1, and the volume percent of the compound represented by formula (1) above is constant (20%). In experiment 1, an $Al_2O_3$ powder with an average grain diameter of 0.2 (μm), an $Y_2O_3$ powder with an average grain diameter of 1.2 (μm), and a $CeO_2$ powder with an average grain diameter of 1.5 (μm) were prepared as raw material powders (FIGURE, step S10), and the volume percent of the compound and the value of the coefficient X were adjusted when the raw material powders were weighed. The purity of each of the powders was 99.9%. The sintering (FIGURE, step S50) was performed at a temperature of 1,350 to 1,450° C. (step S50). The rest of the production method is the same as that in the production method described using the FIGURE.

(condition (1)), the volume percent of the compound (condition (2)), the ratio of the intensity of XRD from the complex oxide to that from the compound (condition (3)), and the average grain diameter of alumina (condition (4)) were analyzed using the methods shown in B1 to B4 above. Moreover, for each of the samples, light emission intensity and a chromaticity variation were measured using methods described below. A sample with a light emission intensity of 100 or more and a chromaticity variation of less than 0.0050 was rated "good," and a sample not meeting these criteria was rated "poor." When the light emission intensity of a ceramic sintered body is 100 or more, this ceramic sintered body has a light emission intensity sufficient for a fluorescent material used for various applications. When the chromaticity variation is less than 0.0050, visual discomfort is unlikely to occur, so that the ceramic sintered body is suitable as a fluorescent material used for various applications.

<Light Emission Intensity>

To measure the light emission intensity, each sample was first cut into a size of 13 mm×13 mm×0.4 mm. The cut sample was irradiated with blue LD light having a wavelength of 462 nm and condensed through a lens to a width of 0.5 mm. Then the light passing through the sample was condensed through a lens, and the emission intensity of the light was measured using a power sensor (PM3Q manufactured by COHERENT) The density (output density) of the irradiation light was 40 W/mm².

<Chromaticity Variation>

To measure the chromaticity variation, each sample was first cut into a size of 20 mm×20 mm×0.4 mm. The cut

TABLE 1

| SAMPLE | CONDITION (1) M1 | M2 | M3 | X | CONDITION (2) VOLUME FRACTION OF $M1_{3-x}M2_xM3_5O_{12}$ (vol %) | OPEN POROSITY (%) | CONDITION (3) COMPLEX OXIDE TYPE | XRD INTENSITY RATIO |
|---|---|---|---|---|---|---|---|---|
| 1 | Y | Ce | Al | 0.001 | 20 | 0.02 | NONE | 0.00 |
| 2 | Y | Ce | Al | 0.003 | 20 | 0.02 | NONE | 0.00 |
| 3 | Y | Ce | Al | 0.015 | 20 | 0.01 | NONE | 0.00 |
| 4 | Y | Ce | Al | 0.030 | 20 | 0.00 | NONE | 0.00 |
| 5 | Y | Ce | Al | 0.090 | 20 | 0.01 | NONE | 0.00 |
| 6 | Y | Ce | Al | 0.150 | 20 | 0.02 | NONE | 0.00 |
| 7 | Y | Ce | Al | 0.100 | 20 | 0.02 | NONE | 0.00 |
| 8 | Y | Ce | Al | 0.300 | 20 | 0.01 | NONE | 0.00 |
| 9 | Y | Ce | Al | 0.500 | 20 | 0.00 | NONE | 0.00 |
| 10 | Y | Ce | Al | 0.700 | 20 | 0.01 | $CeAl_{11}O_{18}$ | 0.05 |
| 11 | Y | Ce | Al | 1.000 | 20 | 0.02 | $CeAl_{11}O_{18}$ | 0.10 |

| SAMPLE | COND. (4) AVE. GRAIN DIA. (μm) | LIGHT EMISSION INTENSITY | CHROMATICITY VARIATION | VICKERS HARDNESS (Gpa) | RATING |
|---|---|---|---|---|---|
| 1 | 0.49 | 90 | 0.0015 | 19.6 | POOR |
| 2 | 0.53 | 103 | 0.0014 | 19.8 | GOOD |
| 3 | 0.50 | 103 | 0.0013 | 19.8 | GOOD |
| 4 | 0.54 | 110 | 0.0015 | 19.7 | GOOD |
| 5 | 0.55 | 116 | 0.0012 | 19.7 | GOOD |
| 6 | 0.60 | 120 | 0.0015 | 19.8 | GOOD |
| 7 | 0.59 | 118 | 0.0018 | 19.7 | GOOD |
| 8 | 0.63 | 110 | 0.0019 | 19.6 | GOOD |
| 9 | 0.63 | 109 | 0.0020 | 19.5 | GOOD |
| 10 | 0.70 | 98 | 0.0022 | 18.3 | POOR |
| 11 | 0.69 | 88 | 0.0020 | 18.0 | POOR |

Next, for each of the ceramic sintered body samples obtained, the composition of the ceramic sintered body sample was irradiated with blue LD light having a wavelength of 462 nm and condensed through a lens to a width of 0.5 mm. Then the light passing through the sample was subjected to measurement using a chroma meter (CL-200A manufactured by KONICA MINOLTA, INC.) to determine the X direction variation (ΔCIEx) in chromaticity. The density (output density) of the irradiation light was 40 W/mm$^2$.

<Open Porosity>

The open porosity of each sample was computed according to JIS R1634.

<Vickers Hardness>

Each of the samples was mirror-polished, and the Vickers hardness of each sample was computed according to JIS R1610. The load used was 5 kgf.

Table 1 shows: elements corresponding to M1, M2, and M3 and the coefficient X (condition (1)) for each sample; the volume percent of the compound represented by formula (1) above (condition (2)); the open porosity; the type of the complex oxide and the ratio of the intensity of XRD from the complex oxide (condition (3)); the average grain diameter of alumina (condition (4)); the light emission intensity; the chromaticity variation; the Vickers hardness; and the rating of each sample. As for the light emission intensity, in samples 2 to 9 in which the coefficient X was within the range of 0.003 to 0.500, the light emission intensity was 100 or more. However, in sample 1 in which the coefficient X was 0.001 and in samples 10 and 11 in which the coefficient X was 0.700 or more, the light emission intensity was less than 100. In sample 1, the amount of M2 serving as an activator was small, and therefore the compound represented by formula (1) above is unlikely to show fluorescence. This may be the reason that the light emission intensity was lower than those in samples 2 to 9. In samples 10 and 11, the ratio of the intensity of XRD from the complex oxide was 0.05 or more, and the amount of M2 was large, so that a complex oxide was generated. This may be the reason that the light emission intensity was lower than those in samples 2 to 9. In all the samples, the chromaticity variation was less than 0.0050. Based on the above results, samples 2 to 9 were rated "good," and samples 1, 10, and 11 were rated "poor." As is clear from Table 1, samples 2 to 9 rated "good" satisfy the above-described conditions (1) to (4). The open porosity of each of the samples was 0.02% or less, and the samples were sufficiently densified. As can be seen from the results of the measurement of the Vickers hardness of each of the samples, each sample has a hardness sufficient for use as a fluorescent material.

Table 2 is a table showing the results of experiment 2. In experiment 2, when the raw material powders were prepared and weighed (FIGURE, step S10), the volume percent of the compound and the value of the coefficient X were adjusted. Specifically, ceramic sintered body samples 12 to 21 with different volume percents of the compound while the coefficient X was held constant (0.030) were produced. The volume percent of the compound represented by formula (1) above in each sample is as shown in Table 2. The rest of the method for producing the samples is the same as that in experiment 1 above.

TABLE 2

| | CONDITION (1) | | | | CONDITION (2) VOLUME FRACTION OF $M1_{3-x}M2_xM3_5O_{12}$ (vol %) | OPEN POROSITY (%) | CONDITION (3) COMPLEX OXIDE | |
|---|---|---|---|---|---|---|---|---|
| SAMPLE | M1 | M2 | M3 | X | | | TYPE | XRD INTENSITY RATIO |
| 12 | Y | Ce | Al | 0.030 | 1 | 0.01 | NONE | 0.00 |
| 13 | Y | Ce | Al | 0.030 | 3 | 0.02 | NONE | 0.00 |
| 14 | Y | Ce | Al | 0.030 | 5 | 0.02 | NONE | 0.00 |
| 15 | Y | Ce | Al | 0.030 | 10 | 0.01 | NONE | 0.00 |
| 16 | Y | Ce | Al | 0.030 | 30 | 0.02 | NONE | 0.00 |
| 17 | Y | Ce | Al | 0.030 | 40 | 0.01 | NONE | 0.00 |
| 18 | Y | Ce | Al | 0.030 | 50 | 0.02 | NONE | 0.00 |
| 19 | Y | Ce | Al | 0.030 | 60 | 0.00 | NONE | 0.00 |
| 20 | Y | Ce | Al | 0.030 | 70 | 0.00 | NONE | 0.00 |
| 21 | Y | Ce | Al | 0.030 | 80 | 0.01 | NONE | 0.00 |

| SAMPLE | COND. (4) AVE. GRAIN DIA. (μm) | LIGHT EMISSION INTENSITY | CHROMATICITY VARIATION | VICKERS HARDNESS (Gpa) | RATING |
|---|---|---|---|---|---|
| 12 | 0.48 | 78 | 0.0020 | 20.8 | POOR |
| 13 | 0.52 | 100 | 0.0025 | 20.7 | GOOD |
| 14 | 0.52 | 113 | 0.0016 | 20.6 | GOOD |
| 15 | 0.55 | 118 | 0.0018 | 20.3 | GOOD |
| 16 | 0.60 | 114 | 0.0019 | 19.1 | GOOD |
| 17 | 0.65 | 110 | 0.0014 | 18.5 | GOOD |
| 18 | 0.69 | 108 | 0.0016 | 17.9 | GOOD |
| 19 | 0.71 | 106 | 0.0015 | 17.3 | GOOD |
| 20 | 0.80 | 103 | 0.0011 | 16.8 | GOOD |
| 21 | 0.85 | 92 | 0.0019 | 16.0 | POOR |

As for the light emission intensity, in samples 13 to 20 in which the volume percent of the compound represented by formula (1) above was 3 to 70%, the light emission intensity was 100 or more. However, in sample 12 in which the volume percent was 1% and in sample 21 in which the volume percent was 80%, the light emission intensity was less than 100. In sample 12, the volume percent of the compound contributing to fluorescence was small. This may be the reason that the light emission intensity was low. In sample 21, the volume percent of the compound represented by formula (1) above was large, and therefore the volume percent of alumina was small. In this case, the thermal conductivity may be low, and temperature quenching may occur. This may be the reason that the light emission intensity was low. In all the samples, the chromaticity variation was less than 0.0050. Based on the above results, samples 13 to 20 were rated "good," and samples 12 and 21 were rated "poor." As is clear from Table 2, samples 13 to 20 rated "good" satisfy the above-described conditions (1) to (4). The open porosity of each of the samples was 0.02% or less, and the samples were sufficiently densified. As can be seen from the results of the measurement of the Vickers hardness of each of the samples, each sample has a hardness sufficient for use as a fluorescent material.

Table 3 is a table showing the results of experiment 3. In experiment 3, the firing temperature in the compact firing step (FIGURE, step S50) was changed for each of the samples to change the average grain diameter of alumina. In a sample with the lowest firing temperature among samples 22 to 35, the firing temperature was 1,300° C. In a sample with the highest firing temperature, the firing temperature was 1,700° C. In experiment 3, when the raw material powders were weighed (FIGURE, step S10), the volume percent of the compound and the value of the coefficient X were adjusted such that the coefficient X was constant (0.030) and the volume percent of the compound was constant (20%). The rest of the method for producing the samples is the same as that in experiment 1 above.

As for the light emission intensity, in samples 22 to 33 in which the average grain diameter of alumina was 3.00 ($\mu$m) or less, the light emission intensity was 100 or more. However, in sample 34 in which the average grain diameter of alumina was 3.50 ($\mu$m) and in sample 35 in which the average grain diameter of alumina was 6.00 ($\mu$m), the light emission intensity was less than 100. In samples 34 and 35, the average grain diameter of alumina was large. In this case, light may be excessively scattered, and the amount of light passing through the ceramic sintered body may be small. This may be the reason that the light emission intensity was small. As for the chromaticity variation, in samples 23 to 35 in which the average grain diameter of alumina was 0.30 ($\mu$m) or more, the chromaticity variation was less than 0.0050. In sample 22 in which the average grain diameter of alumina was 0.15 ($\mu$m), the chromaticity variation was 0.0050 or more. In sample 22, the average grain diameter of alumina was small. In this case, the amount of light passing through the ceramic sintered body may be large, and diffusion of the blue light may be insufficient. This may be the reason that the chromaticity variation occurred. Based on the above results, samples 23 to 33 were rated "good," and samples 22, 34, and 35 were rated "poor." As is clear from Table 3, samples 23 to 33 rated "good" satisfy the above-described conditions (1) to (4). The open porosity of each of the samples was 0.02% or less, and the samples were densified sufficiently, as in experiments 1 and 2. As can be seen from the results of the measurement of the Vickers hardness of each of the samples, each sample has a hardness sufficient for use as a fluorescent material.

TABLE 3

| | CONDITION (1) | | | | CONDITION (2) VOLUME FRACTION OF $M1_{3-x}M2_xM3_5O_{12}$ (vol %) | OPEN POROSITY (%) | CONDITION (3) COMPLEX OXIDE | |
|---|---|---|---|---|---|---|---|---|
| SAMPLE | M1 | M2 | M3 | X | | | TYPE | XRD INTENSITY RATIO |
| 22 | Y | Ce | Al | 0.030 | 20 | 0.01 | NONE | 0.00 |
| 23 | Y | Ce | Al | 0.030 | 20 | 0.02 | NONE | 0.00 |
| 24 | Y | Ce | Al | 0.030 | 20 | 0.02 | NONE | 0.00 |
| 25 | Y | Ce | Al | 0.030 | 20 | 0.01 | NONE | 0.00 |
| 27 | Y | Ce | Al | 0.030 | 20 | 0.00 | NONE | 0.00 |
| 28 | Y | Ce | Al | 0.030 | 20 | 0.00 | NONE | 0.00 |
| 29 | Y | Ce | Al | 0.030 | 20 | 0.01 | NONE | 0.00 |
| 30 | Y | Ce | Al | 0.030 | 20 | 0.02 | NONE | 0.00 |
| 32 | Y | Ce | Al | 0.030 | 20 | 0.01 | NONE | 0.00 |
| 33 | Y | Ce | Al | 0.030 | 20 | 0.00 | NONE | 0.00 |
| 34 | Y | Ce | Al | 0.030 | 20 | 0.01 | NONE | 0.00 |
| 35 | Y | Ce | Al | 0.030 | 20 | 0.02 | NONE | 0.00 |

| SAMPLE | COND. (4) AVE. GRAIN DIA. ($\mu$m) | LIGHT EMISSION INTENSITY | CHROMATICITY VARIATION | VICKERS HARDNESS (Gpa) | RATING |
|---|---|---|---|---|---|
| 22 | 0.15 | 118 | 0.0120 | 20.5 | POOR |
| 23 | 0.30 | 117 | 0.0025 | 19.9 | GOOD |
| 24 | 0.45 | 116 | 0.0021 | 19.8 | GOOD |
| 25 | 0.74 | 113 | 0.0024 | 19.4 | GOOD |
| 27 | 1.00 | 110 | 0.0019 | 19.0 | GOOD |
| 28 | 1.30 | 109 | 0.0026 | 18.8 | GOOD |
| 29 | 1.60 | 107 | 0.0019 | 16.6 | GOOD |
| 30 | 2.10 | 105 | 0.0016 | 18.4 | GOOD |
| 32 | 2.80 | 103 | 0.0015 | 18.1 | GOOD |
| 33 | 3.00 | 101 | 0.0014 | 17.9 | GOOD |
| 34 | 3.50 | 96 | 0.0023 | 17.7 | POOR |
| 35 | 6.00 | 89 | 0.0025 | 17.5 | POOR |

Table 4 is a table showing the results of experiment 4. In experiment 4, the raw material powders were not mixed in stages (FIGURE, step S20), but all the raw material powders were mixed at once to produce sample 36. Specifically, the alumina powder, the powders for forming the compound represented by formula (1) above, and ethanol serving as a solvent were charged into a ball mill and mixed for 20 hours to obtain a slurry of the raw material powders. In experiment 4, the coefficient X was set to 0.030, and the volume percent of the compound was set to 20%. The rest of the production method was the same as that in experiment 1 above.

compound with M1 in sample 44 is $(Y_{0.5}Lu_{0.5})_{2.97}Ce_{0.03}Al_5O_3$. These compounds were produced as follows. In experiment 1, when the raw material powders were prepared and weighed (FIGURE, step S10), $Al_2O_3$ powder, $Y_2O_3$ powder, and $CeO_2$ powder were prepared. However, in experiment 5, one of $Lu_2O_3$ powder, $Yb_2O_3$ powder, $La_2O_3$ powder, $Gd_2O_3$ powder, $Tb_2O_3$ powder, $Sc_2O_3$ powder, and $Er_2O_3$ powder was used instead of the

TABLE 4

| | CONDITION (1) | | | | CONDITION (2) VOLUME FRACTION OF $M1_{3-x}M2_xM3_5O_{12}$ (vol %) | OPEN POROSITY (%) | CONDITION (3) COMPLEX OXIDE | |
|---|---|---|---|---|---|---|---|---|
| SAMPLE | M1 | M2 | M3 | X | | | TYPE | XRD INTENSITY RATIO |
| 36 | Y | Ce | Al | 0.030 | 20 | 0.02 | $CeAl_{11}O_{18}$ | 0.05 |

| | COND. (4) AVE. GRAIN DIA. (μm) | LIGHT EMISSION INTENSITY | CHROMATICITY VARIATION | VICKERS HARDNESS (Gpa) | RATING |
|---|---|---|---|---|---|
| | 0.65 | 96 | 0.0021 | 18.1 | POOR |

The light emission intensity of sample 36 was less than 100, and sample 36 was rated "poor." In sample 36, the ratio of the intensity of XRD from a complex oxide ($CeAl_{11}O_{18}$) to that from the compound represented by formula (1) above was 0.05. It may be considered that the complex oxide absorbed light, casing a reduction in the light emission intensity. As can be seen from the above results, by mixing the raw material powders in stages, the formation of the complex oxide can be prevented.

Table 5 is a table showing the results of experiment 5. In experiments 1 to 4 above, the ceramic sintered body samples produced each contain a compound with M1 being yttrium (Y), M2 being cerium (Ce), and M3 being aluminum (Al). In experiment 5, ceramic sintered body samples each containing a compound in which M1, M2, and M3 were other elements were produced. The elements for M1, M2, and M3 in these samples are as shown in Table 4. For example, a $Y_2O_3$ powder to produce one of samples 37 to 43. $Lu_2O_3$ powder was used in addition to the $Y_2O_3$ powder to produce sample 44, and $Gd_2O_3$ powder was used in addition to the $Y_2O_3$ powder to produce sample 45. $Ga_2O_3$ powder was used in addition to the $Al_2O_3$ powder, the $Y_2O_3$ powder, and the $CeO_2$ powder to produce sample 46. $Eu_2O_3$ powder, $Tb_2O_3$ powder, and $Yb_2O_3$ powder were used instead of the $CeO_2$ powder to produce samples 47 to 49, respectively. $Eu_2O_3$ powder and $Yb_2O_3$ powder were used in addition to the $CeO_2$ powder to produce samples 50 and 51, respectively. In experiment 5, the coefficient X was set to 0.030, and the volume percent of each compound was set to 20%. The rest of the production method was the same as that in experiment 1 above.

TABLE 5

| | CONDITION (1) | | | | CONDITION (2) VOLUME FRACTION OF $M1_{3-x}M2_xM3_5O_{12}$ (vol %) | OPEN POROSITY (%) | CONDITION (3) COMPLEX OXIDE | |
|---|---|---|---|---|---|---|---|---|
| SAMPLE | M1 | M2 | M3 | X | | | TYPE | XRD INTENSITY RATIO |
| 37 | Lu | Ce | Al | 0.030 | 20 | 0.00 | NONE | 0.00 |
| 38 | Yb | Ce | Al | 0.030 | 20 | 0.01 | NONE | 0.00 |
| 39 | La | Ce | Al | 0.030 | 20 | 0.00 | NONE | 0.00 |
| 40 | Gd | Ce | Al | 0.030 | 20 | 0.00 | NONE | 0.00 |
| 41 | Td | Ce | Al | 0.030 | 20 | 0.01 | NONE | 0.00 |
| 42 | Sc | Ce | Al | 0.030 | 20 | 0.02 | NONE | 0.00 |
| 43 | Er | Ce | Al | 0.030 | 20 | 0.01 | NONE | 0.00 |
| 44 | $Y_{0.5} \cdot Lu_{0.5}$ | Ce | Al | 0.030 | 20 | 0.00 | NONE | 0.00 |
| 45 | $Y_{0.5} \cdot Gd_{0.5}$ | Ce | Al | 0.030 | 20 | 0.01 | NONE | 0.00 |
| 46 | Y | Ce | $Al_{0.5} \cdot Ga_{0.5}$ | 0.030 | 20 | 0.02 | NONE | 0.00 |
| 47 | Y | Eu | Al | 0.030 | 20 | 0.00 | NONE | 0.00 |
| 48 | Y | Tb | Al | 0.030 | 20 | 0.00 | NONE | 0.00 |

TABLE 5-continued

| | | | | | | | | |
|---|---|---|---|---|---|---|---|---|
| 49 | Y | Yb | Al | 0.030 | 20 | 0.01 | NONE | 0.00 |
| 50 | Y | $Ce_{0.5} \cdot Eu$ | Al | 0.030 | 20 | 0.02 | NONE | 0.00 |
| 51 | Y | $Ce \cdot Gd_{0.5}$ | Al | 0.030 | 20 | 0.02 | NONE | 0.00 |

| SAMPLE | COND. (4) AVE. GRAIN DIA. (μm) | LIGHT EMISSION INTENSITY | CHROMA-TICITY VARIATION | VICKERS HARDNESS (Gpa) | RATING |
|---|---|---|---|---|---|
| 37 | 0.60 | 119 | 0.0028 | 19.0 | GOOD |
| 38 | 0.65 | 116 | 0.0024 | 19.1 | GOOD |
| 39 | 0.70 | 113 | 0.0025 | 18.9 | GOOD |
| 40 | 0.75 | 115 | 0.0020 | 18.5 | GOOD |
| 41 | 0.76 | 114 | 0.0024 | 18.6 | GOOD |
| 42 | 0.69 | 112 | 0.0021 | 18.9 | GOOD |
| 43 | 0.70 | 110 | 0.0019 | 18.8 | GOOD |
| 44 | 0.68 | 109 | 0.0021 | 18.8 | GOOD |
| 45 | 0.70 | 106 | 0.0020 | 18.9 | GOOD |
| 46 | 0.59 | 111 | 0.0019 | 19.2 | GOOD |
| 47 | 0.61 | 108 | 0.0017 | 19.0 | GOOD |
| 48 | 0.63 | 110 | 0.0016 | 19.0 | GOOD |
| 49 | 0.58 | 109 | 0.0020 | 19.6 | GOOD |
| 50 | 0.60 | 112 | 0.0025 | 19.3 | GOOD |
| 51 | 0.62 | 115 | 0.0028 | 19.2 | GOOD |

As for the light emission intensity and the chromaticity variation, for all the samples, the light emission intensity was 100 or more, and the chromaticity variation was less than 0.0050. Therefore, in experiment 5, all the samples (samples 37 to 51) were rated "good." In experiment 5, all the samples satisfy the above-described conditions (1) to (4). The open porosity in each of the samples was 0.02% or less, and the samples were densified sufficiently, as in experiments 1 to 4. As can be seen from the results of the measurement of the Vickers hardness of each of the samples, each sample has a hardness sufficient for use as a fluorescent material. The results of experiment 5 show the following. The elements located in the M1, M2, and M3 sites of the compound are not limited to yttrium (Y), cerium (Ce), and aluminum (Al), and any elements satisfying the above condition (1) may be used. The reduction in light emission intensity of a ceramic sintered body and the reduction in chromaticity variation can be suppressed so long as the ceramic sintered body satisfies the above conditions (2) to (4) and the elements located in the M1, M2, and M3 sites satisfy the above condition (1).

As can be seen from the results of experiments 1 to 5, in a ceramic sintered body satisfying the above conditions (1) to (4), a reduction in light emission intensity and a reduction in chromaticity variation can be suppressed while the durability of the ceramic sintered body is improved.

E. Modifications:

In the examples shown in the above experiments 1 to 5, M1 is selected from scandium (Sc), yttrium (Y), gadolinium (Gd), terbium (Tb), erbium (Er), ytterbium (Yb), and lutetium (Lu). However, M1 may be at least one selected from scandium (Sc), yttrium (Y), and lanthanoid elements. This is because of the following reason. Lanthanoid elements other than gadolinium (Gd), terbium (Tb), erbium (Er), ytterbium (Yb), and lutetium (Lu) (i.e., lanthanum (La), praseodymium (Pr), neodymium (Nd), promethium (Pm), samarium (Sm), europium (Eu), dysprosium (Dy), holmium (Ho), and thulium (Tm)) have characteristics originating from excitation within 4f orbitals or excitation from a 4f orbital to a 5d orbital, as do the elements exemplified in the above experiments. Therefore, the light emission intensity and the chromaticity variation when any of these lanthanoid elements is used are similar to those in the above experiments. Similarly, in the examples shown in the above experiments, M2 is selected from cerium (Ce), europium (Eu), terbium (Tb), and ytterbium (Yb). However, M2 may be at least one selected from elements other than the element selected for M1.

In the ceramic sintered body production method described above, the firing is performed in a vacuum, and the pressing is performed using the HIP method to obtain the ceramic sintered body. However, the firing may be performed in a reducing atmosphere, and the pressing may be performed using a hot-pressing method.

The present invention is not limited to the above-described embodiments and modifications and may be embodied in various other forms without departing from the spirit of the invention. For example, the technical features in the embodiments and modifications corresponding to the technical features in the modes described in SUMMARY OF THE INVENTION can be appropriately replaced or combined to solve some of or all the foregoing problems or to achieve some of or all the foregoing effects. A technical feature which is not described as an essential feature in the present description may be appropriately deleted.

What is claimed is:

1. A ceramic sintered body characterized by comprising: alumina ($Al_2O_3$); and
a compound represented by $M1_{3-x}M2_xM3_5O_{12}$, wherein
the volume percent of the compound in the ceramic sintered body is from 3% to 70% inclusive;
the ratio of the intensity of X-ray diffraction from a complex oxide of aluminum (Al) and the M2 to the intensity of X-ray diffraction from the compound in the ceramic sintered body is less than 0.05;
the average grain diameter of the alumina ($Al_2O_3$) contained in the ceramic sintered body is from 0.30 (μm) to 3.00 (μm) inclusive;
the M1 is at least one selected from scandium (Sc), yttrium (Y), and lanthanoid elements;
the M2 is at least one selected from lanthanoid elements except any lanthanoid element selected for the M1;
the M3 is at least one of aluminum (Al) and gallium (Ga); and
the X is from 0.003 to 0.500 inclusive.

2. A ceramic sintered body according to claim 1, wherein
the M1 is at least one selected from scandium (Sc), yttrium (Y), gadolinium (Gd), terbium (Tb), erbium (Er), ytterbium (Yb), and lutetium (Lu); and
the M2 is at least one selected from cerium (Ce), europium (Eu), terbium (Tb), and ytterbium (Yb) except the at least one element selected for the M1.

3. A ceramic sintered body according to claim 2, wherein the M1 is yttrium (Y).

4. A ceramic sintered body according to claim 2, wherein the M2 is cerium (Ce).

5. A ceramic sintered body according claim 1, wherein the M3 is aluminum (Al).

6. A ceramic sintered body according to claim 2, wherein the M1 is yttrium (Y), the M2 is cerium (Ce), and the M3 is aluminum (Al).

* * * * *